(12) United States Patent
Geyer et al.

(10) Patent No.: US 10,074,978 B2
(45) Date of Patent: Sep. 11, 2018

(54) MODEL PREDICTIVE CONTROL OF A MODULAR MULTILEVEL CONVERTER

(71) Applicant: ABB Schweiz AG, Baden (CH)

(72) Inventors: Tobias Geyer, Zürich (CH); Wim Van-Der-Merwe, Baden-Dättwil (CH); Vedrana Spudic, Zürich (CH); Georgios Darivianakis, Langnau am Albis (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/413,125

(22) Filed: Jan. 23, 2017

(65) Prior Publication Data

US 2017/0133845 A1    May 11, 2017

Related U.S. Application Data

(63) Continuation of application No. PCT/EP2015/066312, filed on Jul. 16, 2015.

(30) Foreign Application Priority Data

Jul. 22, 2014  (EP) .................................... 14178048

(51) Int. Cl.
*H02J 3/01* (2006.01)
*H02M 1/08* (2006.01)
(Continued)

(52) U.S. Cl.
CPC ............. *H02J 3/01* (2013.01); *G05B 13/048* (2013.01); *H02M 1/08* (2013.01); *H02M 1/12* (2013.01); *H02J 2003/007* (2013.01)

(58) Field of Classification Search
CPC .. H02M 1/08; H02M 1/12; H02M 1/14; H02J 3/01; G05B 13/048
See application file for complete search history.

(56) References Cited

U.S. PATENT DOCUMENTS

| 7,638,983 B2 * | 12/2009 | Park | H02M 5/4585 |
|---|---|---|---|
| | | | 290/44 |
| 8,824,169 B2 * | 9/2014 | Wang | H02M 7/493 |
| | | | 363/131 |

(Continued)

FOREIGN PATENT DOCUMENTS

WO    2014006200 A1    1/2014

OTHER PUBLICATIONS

European Patent Office, International Search Report & Written Opinion issued in corresponding Application No. PCT/EP2015/066312, dated Dec. 17, 2015, 12 pp.

(Continued)

*Primary Examiner* — Matthew Nguyen
(74) *Attorney, Agent, or Firm* — J. Bruce Schelkopf; Taft Stettinius & Hollister LLP

(57) ABSTRACT

A method for controlling a modular converter connected to an electrical grid for active power filtering the electrical grid to compensate for a load connected to the electrical grid, comprises: receiving an actual load current and an actual converter state of the modular converter; determining, from the actual load current and a history of previous load currents, a sequence of future load currents over a prediction horizon; predicting a sequence of future converter states of the modular converter and a sequence of manipulated variables for the modular converter over the prediction horizon by solving an optimization problem based on the actual converter state and the future load currents by minimizing an objective function mapping control objectives to a scalar performance index subject to the dynamical evolution of a prediction model of the modular converter and subject to constraints; and applying a next switching state, which is determined from a first element of the sequence of manipulated variables, to the modular converter.

19 Claims, 6 Drawing Sheets

(51) Int. Cl.
*H02M 1/12* (2006.01)
*G05B 13/04* (2006.01)
*H02J 3/00* (2006.01)

(56) References Cited

U.S. PATENT DOCUMENTS

2012/0218794 A1* 8/2012 Kake .................. H02J 3/38
363/95
2017/0117748 A1* 4/2017 Mondal .................. H02J 9/061

OTHER PUBLICATIONS

European Patent Office, Extended Search Report issued in corresponding Application No. 14178048.6, completed Jan. 20, 2015, 9 pp.
Cortes et al., "Model Predictive Control of Cascaded H-Bridge Multilevel Inverters," 13th European Conference on Power Electronics and Applications, Barcelona, Spain, Sep. 8-10, 2009, 9 pp.
Mendalek et al., "A Non-Linear Optimal Predictive Control of a Shunt Active Power Filter," Conference Record of the 2002 IEEE Industry Applications Conference, Pittsburgh, Pennsylvania, Oct. 13-18, 2002, pp. 70-77.
Quevedo et al., "Finite constraint set receding horizon quadratic control," Int. J. Robust Nonlinear Control, 2004, vol. 14, pp. 355-377.
Riar et al., "Model Predictive Direct Current Control of Modular Multi-Level Converters," ICIT, IEEE International Conference, Feb. 25, 2013, pp. 582-587.

\* cited by examiner

MODEL PREDICTIVE CONTROL OF A MODULAR MULTILEVEL CONVERTER

FIELD OF THE INVENTION

The invention relates to a method, a controller, a computer program and a computer-readable medium for controlling a modular multilevel converter connected to an electrical grid. The converter is used to compensate reactive power in the network and to perform active power filtering in the electrical grid, in particular to compensate for a load connected to the electrical grid. Furthermore, the invention relates to a converter system with such a controller.

BACKGROUND OF THE INVENTION

Modular Multilevel Converters (MMC) may be used as Static VAR Compensators (Statcoms) and/or Flexible AC Transmission Systems (FACTS) connected to an electrical grid supplying electrical power to a load. Specifically, a Statcom is connected at a Point of Common Coupling (PCC) to an electric power grid that is negatively affected by current harmonics and/or reactive power injected by a load connected to the grid. The task of the Statcom is then to provide active power filtering, by injecting harmonics and/or reactive power into the PCC, such that the grid currents are free of harmonics and are in phase with the grid voltage, resulting in zero reactive power.

Conventional control of modular multilevel converters in general and Statcoms in particular includes two hierarchical control layers. The upper control layer is based on vector control with a modulator. Multiple PI loops may be used to control the load and the circulating currents by manipulating the voltage reference of a modulator. Typically, carrier-based Pulse Width Modulation (PWM) or Space Vector Modulation (SVM) may be used as modulator. The lower control layer utilizes a redundancy in converter states (i.e. groups of switching states that produce the same line to line voltage) in order to balance the capacitor voltages.

The patent application WO2014/033155 relates to model predictive control of a DC/AC converter supplying electrical power to a load such as a motor, with load currents being exclusively determined by the branch currents of the converter. A first (MPC) control stage supersedes the vector control of the upper control layer as described above, and manipulates a real-valued voltage reference to be provided to a second (PWM modulator) control stage.

The patent application WO2014/006200 discloses a Model Predictive Direct Current Control MPDCC scheme for a Modular Multilevel Converter in Statcom applications. Optimum converter module switching sequences with a trajectory of the controlled variables (currents, voltages) respecting predefined hysteresis bounds are determined. The MPC scheme directly manipulates the individual switch positions or switching states of the power semiconductor switches in the converter modules. An intermediate control stage such as a modulator is not required, nor are there any sorting lists being used in a balancing stage. MPDCC is reported to achieve a very fast current response during power-up and power-down transients as compared to a PWM based scheme.

Active power filtering capabilities of an MMC Statcom include one or more of

Injection of appropriate harmonics into the PCC to compensate for load harmonics.

Compensation of reactive power at the PCC.

Injection of negative sequence currents to compensate for imbalance in the load.

Very fast dynamic response to load transients from arc furnaces, faults in the grid or the load, or low-voltage ride through operations.

DESCRIPTION OF THE INVENTION

It may be an objective of the invention to provide a Statcom with a very fast control method, which reduces harmonics in an electrical grid in a fast and efficient manner, compensates for reactive power, minimizes the voltage ripple on the module capacitors, minimizes the converter losses, and maintains the capacitor voltages and branch currents within given upper and lower bounds.

These objectives are achieved by the subject-matter of the independent claims. Further exemplary embodiments are evident from the dependent claims and the following description.

A first aspect of the invention relates to a method for controlling a modular converter connected to an electrical grid for active power filtering the electrical grid to compensate for a load connected to the electrical grid.

The modular converter may be a Statcom and/or may be part of a flexible AC transmission system (FACTS). The modular converter may be a modular multilevel converter and/or may comprise at least one converter branch, which comprises at least two series connected converter cells or modules. The converter cells may be half-bridge cells or full-bridge cells. Each converter cell may comprise a cell capacitor. For example, the modular converter may comprise three converter branches, which are star-connected or delta-connected.

According to the invention, a method for controlling a modular multilevel converter connected to an electrical power grid for active power filtering and/or for compensating a load connected to the electrical grid comprises the following steps:

Receiving an actual, or updated, load current flowing in the electrical grid between a Point of Common Coupling of the modular converter and the load, and an actual converter state (x) of the modular converter.

Determining, from the actual load current and a history of previous load currents, a sequence of future load currents over a prediction horizon. Hence it is possible to include a behaviour of the load connected to the grid in the converter control through a load current beyond or outside of a converter model, specifically through a load current prediction based on past measurements of the load current.

Determining in an MPC stage an optimum sequence of manipulated variables, or control inputs, by solving an optimization problem based on the actual converter state and the sequence of future load currents, and based on sequences of future converter states predicted from candidate sequences of manipulated variables over the prediction horizon, and subject to constraints.

Controlling, or operating, the modular converter according to first converter cell or module switching states determined from a first element of the optimum sequence of manipulated variables.

According to an embodiment of the invention, the method comprises: receiving an actual load current and an actual converter state of the modular converter, determining, from the actual load current and a history of previous load currents, a sequence of future load currents over a prediction horizon, predicting a sequence of future converter states of the modular converter and a sequence of manipulated variables for the modular converter over the prediction horizon by solving an optimization problem based on the actual converter state and the future load currents by minimizing an objective function mapping control objectives to a scalar performance index subject to the dynamical evolution of a prediction model of the modular converter and subject to constraints and applying a next switching state, which is determined from a first element of the sequence of manipulated variables, to the modular converter.

In other words, in a first step, measured values from the load and the converter are received, which are used to control the converter in a closed loop. For example, the grid current (which usually comprises three values for three phases for each time step) is the sum of the load current and the converter current produced by the modular converter.

In a second step, the control is performed by model predictive control, in which from the measured values, the future behavior of the system (comprising the modular converter, the grid and the load) is predicted based on a mathematical prediction model of the system. Since the behavior of the load (the sequence of future load currents) may not be modeled (since, it may be, for example, another grid which supplies lots of singular loads), its future behavior is predicted from the measured load current and its history alone, for example by analyzing its harmonics and extrapolating these harmonics into the future.

In a third step, a sequence of optimal future values for the manipulated variables is calculated by solving an optimisation problem. This results in a sequence of future manipulated variables, for example a sequence of normalized branch voltage references (also called insertion index) that have to be generated by the modular converter.

In a fourth step, according to a receding horizon policy only the first element of the sequence of manipulated variables (i.e. the one for the current time step) is applied to control the converter.

After that, during the next time step, all four steps are executed again, wherein the sequences may be calculated again over a prediction horizon of more than one time step, which is shifted by one time step.

With this method, active power filtering using model predictive control (MPC) may be performed with a Statcom based on a modular multilevel converter (MMC).

In general, the prediction horizon (which may be seen as a future time horizon) may comprise $N_p$ steps (a natural number) and may start at the current time step k.

The prediction model may comprise several time dependent differential equations, which model the converter and the grid voltage.

When modeling these equations, all converter cells and their cell capacitors may be assumed to be identical, and the capacitor voltages per module may be assumed to be balanced within each converter branch. The series connection of the converter cells inserted into the branch can then be approximated by a single time-varying branch capacitor $C_r$, with the voltage $v_r$, where r denotes the different branches. For example, for a modular converter with three branches r may be 1, 2 or 3.

By assuming that the cell capacitors are the same and that the capacitor voltages are balanced, the capacitor voltages may be summed up to the total capacitor voltage per branch, and the prediction model may only predict these sums, rather than the individual cell capacitor voltages. This may reduce the number of state variables required in the prediction model by the number of converter cells per branch.

The equations of the prediction model may be linearized at each time step and may be evaluated in discrete time steps.

A nonlinear prediction model may be linearized at the current (actual) time step k around certain variables, such as the branch currents and the insertion indices as the manipulated variable. The result is a prediction model that is time-invariant within the prediction horizon.

Alternatively, this linearization could be done around the predicted trajectory of the insertion index and the total capacitor voltage. The trajectories of certain variables (such as branch currents and insertion indices) can be predicted, using for example the past prediction at time step k−1, and the linearization can be done around these trajectories. This leads to a prediction model that is time-varying within the prediction horizon.

Additionally, to remove any steady-state tracking error, integrators may be added to the prediction model and/or to the objective function.

During grid fault conditions, such as for example a single-phase voltage dip, an additional current may be injected by the control method into the affected phase to help facilitate grid stabilization. This current could be a reactive current for the affected phase. This may be achieved by augmenting the objective function by an additional term that penalizes the difference between the additional current that is injected and its reference.

According to an embodiment of the invention, the sequence of future load currents is determined by: determining phases, amplitudes and frequencies of a fundamental waveform and of higher-order harmonics from actual and past measurements of load currents and predicting, or extrapolating, the fundamental waveform and the higher-order harmonics with the determined phases, amplitudes and frequencies over the prediction horizon.

The load currents may be currents measured at the connection point of the converter to the interconnection between the grid and the load (the so called point of common coupling). For example, these currents may be measured over a past time interval and may then be analyzed with respect to their harmonics. Phases, amplitudes and frequencies of the harmonics may be determined by calculating Fourier coefficients for a past time interval (i.e. for the history of load currents) and by using these coefficients to predict the harmonics during the prediction horizon. The calculation of the relevant current parameters may be facilitated through the use of several PLLs (phase locked loops) or derivatives thereof.

Alternatively or additionally, the load currents may be measured and their symmetrical components may be estimated. For the fundamental harmonic and for each higher harmonic, the symmetrical components may be determined, namely the positive, zero and negative sequence components. Based on this analysis, which may be performed in real time, the future evolution of the load currents may be predicted, by assuming that the phasors of the harmonics (amplitude, phase and frequency) remain unchanged within the prediction horizon. Specifically, the symmetrical components of the fundamental harmonic and the higher harmonics may be computed for several time steps into the future and summed up at each time step, using the notion of superposition. This yields the predicted evolution of the load currents at time steps k+1, k+2, . . . k+$N_p$−1.

In general, harmonic compensation by the modular converter may be achieved by estimating and detecting harmonics (for example using the notion of symmetrical components and/or dq reference frames for each harmonic) and predicting the future time-domain evolution of these harmonics within the prediction horizon (for example by assuming that the phasors of the harmonics remain constant within the prediction horizon and by using superposition).

On the other hand, unpredictable harmonics and disturbances (caused for example by grid faults or arc furnaces) may be compensated for with a high bandwidth (i.e. short response time) of the control method, which may be achieved by choosing a large penalty for the load current error and a small penalty for varying the manipulated variables in the objective function.

Furthermore, in this case, bounds on the load current error may be introduced. If these bounds are violated, it may be switched to a faster and more aggressive control method, e.g. by using a shorter prediction horizon.

According to an embodiment of the invention, the sequence of future converter states is predicted based on a modified reference grid current, which is the sum of a basic reference grid current and a balancing current, which balances the active power requirements of the modular converter. To compensate the energy, which is consumed by the modular converter itself, such as the converter losses, an outer control loop may be added, and a balancing current is determined, which is added to the basic reference current. The balancing current may be based on the time evolution of the energy stored in the cell capacitors.

According to an embodiment of the invention, the actual converter state and/or future converter states comprise branch voltages and/or branch currents of the modular converter. For example, for a modular converter in delta-configuration, the state variables x of the prediction model may be the three branch currents and the three total branch voltages (i.e. the sum of the individual cell capacitor voltages per branch). The manipulated variables u may be the three insertion indices. The control outputs y may be the grid currents, which are the sum or a linear combination of the branch currents plus the load currents.

In general, the controller executing the control method may comprise two or more control layers. In a first layer, the manipulated variable for the current time step may be determined by model predictive control. Discrete branch voltage references then may be determined in a second control layer, for example by pulse width modulation or space vector modulation. In a third layer, switching states may be determined from the discrete branch voltage references, by choosing one switching state from several equal switching states all generating the same branch voltage subject to a specific objective, which is, for example to balance the capacitor voltages within the branch. This can be, for example, accomplished by a so-called sorting list.

According to an embodiment of the invention, the manipulated variable provided by the first control layer is a real-valued normalized branch voltage reference, also called insertion index, indicative of a number of converter cells of the modular converter to be inserted or connected per converter branch either with positive or with negative cell polarity. For each branch r, the insertion index $n_r$ may be defined as the percentage of converter cells inserted into the branch, either with positive or with negative sign (if full-bridges are used). Assuming a relatively large number of converter cells per branch, the insertion index may in fact be considered to be a real-valued variable between 1 and 0 (or equivalently for full-bridge cells between 1 and −1) that is independent of a total number of modules or cells per branch and thus more amenable to the optimization procedure than a discrete-valued manipulated variable.

According to an embodiment of the invention, for example for each branch r, the insertion index $n_r$ may be defined as the percentage of the nominal sum of the capacitor voltages of a branch. By scaling the insertion index by the actual sum of the capacitor voltages, the percentage of converter cells to be inserted into the branch may be obtained.

According to an embodiment of the invention, a discrete-valued insertion index provided by the second control layer is determined from the real-valued insertion index by pulse width modulation. In other words, the MPC scheme drives a PWM which decides on the number of modules to be inserted into each branch and their polarity.

According to an embodiment of the invention, a detailed switching state, indicating which converter cells are to be connected to a converter branch, is determined from the discrete-valued insertion index such that capacitor voltages of the converter cells are balanced in the converter branch. This may be achieved with a sorting list. For example, the cell capacitor voltages may be sorted in an ascending/descending order of their voltage values. For a charging current, the cell capacitors with the lowest voltages are selected first, and conversely, the cell capacitors with the highest voltages are prioritized for discharging currents.

According to an embodiment of the invention, the objective function is a quadratic function, which minimizes a change of the manipulated variable over the prediction horizon and/or which minimizes deviations of controlled variables from their references. Controlled variables, for example, may be linear combinations of the state variables of the modular converter.

An objective function J may be formulated as a sum over the prediction horizon. The objective function may penalize the error between the predicted grid currents and the desired grid currents, the error between the predicted total branch voltages and their references and/or the changes in the values of the insertion indices.

According to an embodiment of the invention, the objective function comprises a term penalizing the magnitude of branch currents to minimize conduction and switching losses and/or the objective function comprises a term penalizing a capacitor voltage ripple to minimize losses in cell capacitors and/or to reduce the size of cell capacitors.

Additional terms can be added to the objective function, such as penalties on the branch currents and/or the circulating current, which may be a linear combination of the branch currents. To minimize the overall losses in the converter, penalties on the weighted product between the magnitude of the branch currents and the capacitor voltage ripples may be added to the objective function.

According to an embodiment of the invention, the optimization problem is solved subject to hard constraints of the converter states and/or manipulated variables to be obeyed, when solving the prediction model. Hard constraints may be formulated as additional inequalities, which are taken into account when the optimization problem is solved, such as by quadratic programming. The prediction model may be seen as equality constraints of the optimization problem.

For example, hard constraints in the form of inequalities are imposed on the three insertion indices, constraining them between −1 and 1 and/or on the converter branch currents to keep them within the safe operating area of the semiconductors.

According to an embodiment of the invention, the optimization problem is solved subject to soft constraints based on a soft constraint term added to the objective function, which maps a violation of a soft inequality constraint into a number. Soft constraints are not described by (hard) inequality constraints, but by (soft) inequality constraints with slack variables and by additional terms in the objective function that penalizes these slack variables. Soft constraints may be seen as inequality constraints that can be violated, but at a high penalty.

Soft constraints may be applied on variables that are associated with the safe operating regime. These variables typically include the branch currents, for example up to the limit specified by the semiconductor ratings or a limit imposed by a certain failure in time (FIT) rate, and the (total) capacitor voltages per branch. For example, soft constraints may be added on the three branch currents and on the three total capacitor voltages.

In general, the optimization problem may be solved in the following way: The quadratic objective function containing the terms on the output variable errors, terms of violated soft constraints and terms on changing the manipulated variable is minimized over the prediction horizon $N_p$, subject to the linear equality constraints of the prediction model and the inequalities of the hard constraints.

This optimization problem constitutes a so-called quadratic program (QP). QPs can be solved efficiently using for example fast gradient, interior point or active set methods. The result of the QP is an optimum sequence of manipulated variables U. Out of this sequence U, only the first element u(k) is implemented and sent as manipulated variable to the next control layer. In particular, for a delta-connected modular converter, u(k) may include three insertion indices, which may be interpreted as voltage references for a subsequent PWM layer. For a double-star modular converter with six branches, u(k) may include six insertion indices.

In general, with the objective function and the set of constraints, the control method may meet one or more of the following requirements: minimization of the difference between the reference values of the controlled parameters e.g. the grid current reference and the actual value, minimization of the branch currents to minimize the converter conduction losses, balancing of the cell capacitor voltages around their nominal values, operation of the converter within its safe operating limits, keeping the branch currents below a maximum current and/or keeping the cell capacitor voltages below maximum voltage.

A further aspect of the invention relates to a controller, which is adapted for executing the method as described in the above and in the following. For example, the method may be implemented at least partially in hardware such as an FPGA or DSP.

Further aspects of the invention relate to a computer program, which, when executed by a processor, is adapted for executing the method as described in the above and in the following, and to a computer-readable medium, on which such a computer program is stored. A computer-readable medium may be a floppy disk, a hard disk, an USB (Universal Serial Bus) storage device, a RAM (Random Access Memory), a ROM (Read Only memory) and an EPROM (Erasable Programmable Read Only Memory).

Alternatively or additionally, the method may be implemented at least partially in software. For example, the above-mentioned controller may comprise a processor, which executes the computer program stored in the controller.

A further aspect of the invention relates to a converter system, which comprises a modular converter connectable to an electrical grid, wherein the converter comprises at least one converter branch, which comprises at least two series connected converter cells and a controller as described above and in the following controlling the modular converter.

According to an embodiment of the invention, the converter comprises star-connected converter branches, delta-connected converter branches or a double star arrangement comprising six branches.

It has to be understood that features of the method as described in the above and in the following may be features of the converter system, the controller, the computer program and the computer-readable medium as described in the above and in the following, and vice versa.

In general, the disclosed control method may have the following benefits:

It may respond very fast to transients, disturbances and faults. The dynamic performance may only be limited by the available voltage margin and the limits imposed by the safe operating range. As such, the control method may operate the modular converter at its physical limitations. This may be in stark contrast to traditional PI-based control methods for the MMC.

The control method may provide a good balancing of the capacitor voltages also during fast transients.

The control method may guarantee that a safe operating range of the modular converter will not be violated. This may be achieved by the imposition of both soft and hard constraints on branch currents and capacitor voltages.

The control method may very well reject harmonics and imbalances due to arc furnaces and related applications.

The control method may provide a discrete harmonic spectrum due to the use of a PWM stage.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
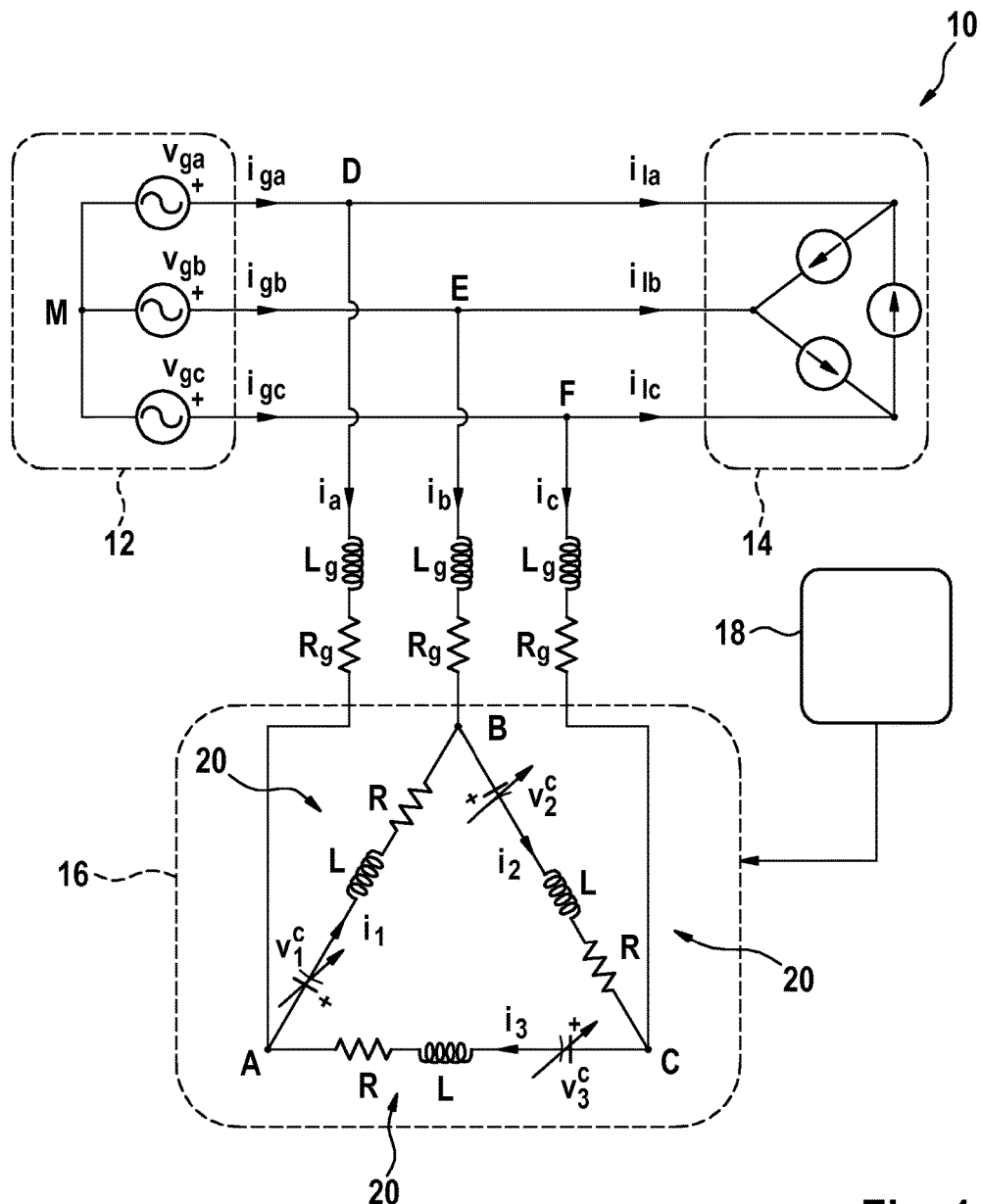
FIG. 1 schematically shows a converter system according to an embodiment of the invention.

FIG. 1 shows a three-phase converter system 10 comprising an electrical grid 12, an electrical load 14 interconnected with the electrical grid 12 and a modular converter 16 connected to the interconnection between the grid 12 and the load 14. The modular converter 16 is controlled by a controller 18. The load 14 injects current harmonics and/or reactive power into this interconnection. The modular converter 16 is a Statcom for filtering these harmonics and/or reactive power.

The grid 12 provides for each phase a grid voltage $v_g=[v_{ga}, v_{gb}, v_{gc}]$. The load 14 has a load current $i_l=i[i_{la}, i_{lb}, i_{lc}]$. The grid current $i_g=[i_{ga}, i_{gb}, i_{gc}]$ is the sum of the grid current $i_g$ and a converter current $i=[i_a, i_b, i_c]$.

The converter 16 is only shown schematically as an equivalent circuit diagram with three converter branches 20 for indicating the branch currents $[i_1, i_2, i_3]$ and the branch voltages $[v_1^c, v_2^c, v_3^c]$.

In general, all the vectors $v_g$, $i_l$, $i_g$, etc. are column vectors. However, due to reasons of simplicity, these and similar vectors are written as row vectors in the present disclosure.

The controller 18 regulates the grid currents $[i_{ga}, i_{gb}, i_{gc}]$ along their time-varying (sinusoidal) references, maintains the capacitor voltages close to their nominal values and minimizes the device switching losses. Furthermore, the branch currents and the capacitor voltages are kept within their given bounds, which are due to physical limitations of the switching devices and passive components.

Figure 2:
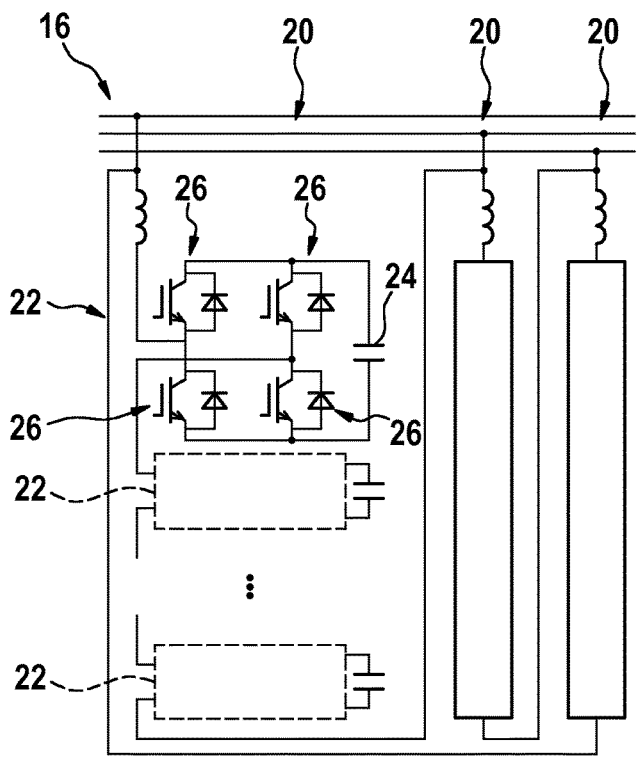
FIG. 2 schematically shows a converter for the converter system of FIG. 1.
Figure 3:
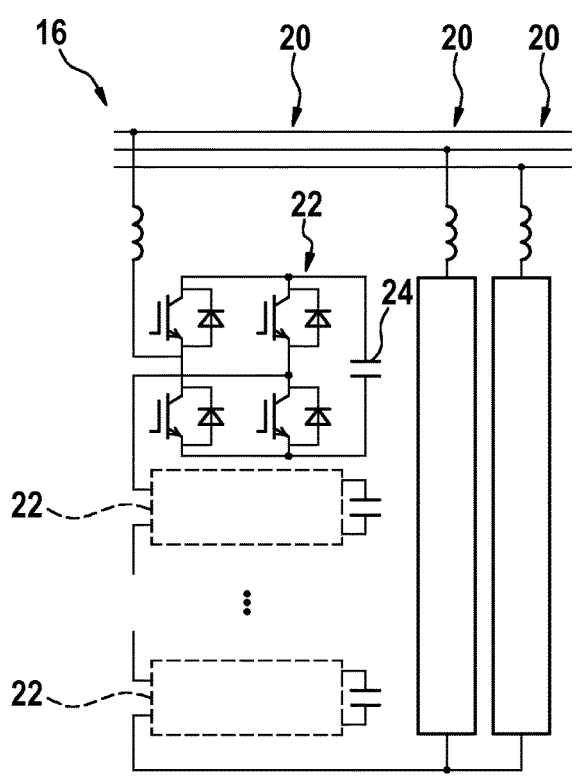
FIG. 3 schematically shows a converter for the converter system of FIG. 1.
Figure 4:
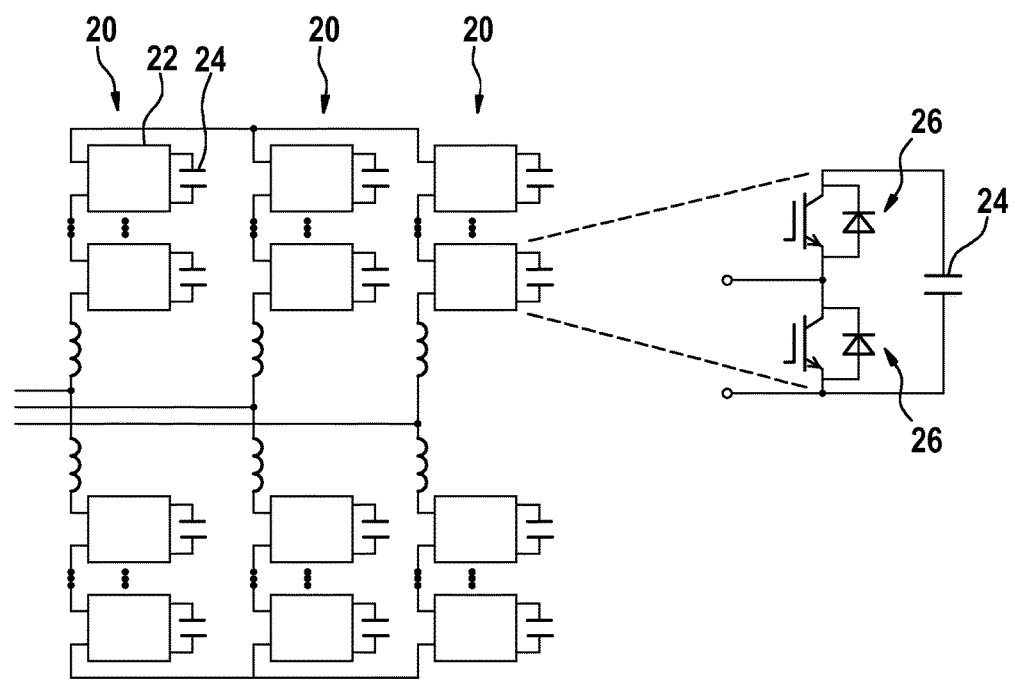
FIG. 4 schematically shows a converter for the converter system of FIG. 1.

As shown in FIGS. 2 to 4, the converter 16 is a multilevel converter with a plurality of converter cells 22 connected in series in each branch 20 to increase the branch voltage. The converter 16 may comprise delta-connected branches 20 (FIG. 1 and FIG. 2) or may comprise star-connected branches 20 (FIGS. 3 and 4). FIG. 4 shows a double-star configuration. In FIGS. 2 and 3, the converter cells are full-bridge cells 22, whereas in FIG. 4 the converter cells 22 are half-bridge cells. Half-bridge cells provide only unidirectional power flow, while full-bridge cells allow for bidirectional power flow. In both cases, a converter cell 22 comprises a cell capacitor 24, which may be connected in one direction (half-bridge cell) or in two directions (full-bridge cell) to its converter branch 20 by the control of the controller 18, which generates switching signals for the semiconductor switches 26 of the converter cell 22.

The control method as described above and in the following is applicable to all types of modular multilevel converters, such as the shown converters or other converters like direct modular multilevel converters, matrix modular multilevel converters or hexverters. The control concept remains unchanged, only the system matrices and the dimension of the vectors in the objective function need to be adapted to the specific modular multilevel converter topology.

Figure 5:
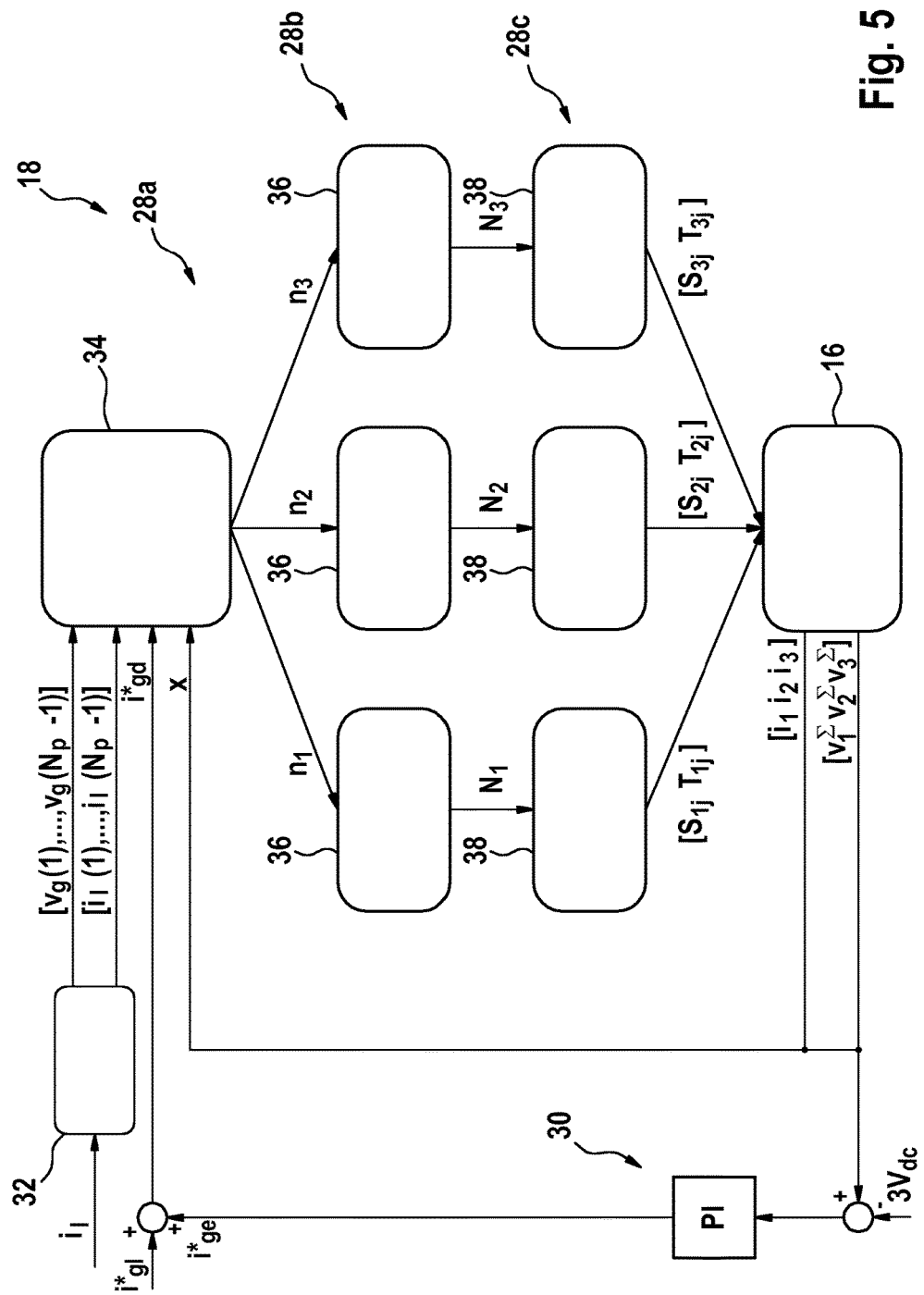
FIG. 5 schematically shows a controller for the converter system of FIG. 1.

FIG. 5 shows details of the controller 18. The controller 18 comprises three control layers 28a, 28b, 28c and an outer active power balancing control loop 30.

In the first control layer, a load current predictor 32 receives the load current $i_l$, and predicts a sequence of future load currents $[i_l(1), \ldots, i_l(N_p-1)]$ from the actual load current and a history of previous load currents. The future load currents are predicted over a prediction horizon of $N_p$ time steps.

The predicted values for the load currents $[i_l(1), \ldots, i_l(N_p-1)]$, and also for the grid voltages $[v_g(1), \ldots, v_g(N_p-1)]$ may be computed using a symmetrical components estimation and prediction scheme.

The first control layer comprises furthermore a model predictive control module 34, which receives the future load currents $[i_l(1), \ldots, i_l(N_p-1)]$ and the future grid voltages $[v_g(1), \ldots, v_g(N_p-1)]$. The prediction of the grid voltages and load currents enables the model predictive control module 34 to compensate the reactive power and filter the load harmonics by solving an optimization problem.

The model predictive control module 34 is based on the principles of constrained optimal control. An online optimization process is employed to determine the optimal future control inputs under various system objectives and constraints. The optimal control problem is solved at each sampling instant k over the prediction horizon 40 to generate the optimal sequence of manipulated variables U such that an objective function J is minimized. Only the first input u(k) is applied to the next control layer 28b and the process is repeated at the next sampling instant k+1 in accordance with a so called receding horizon policy. The objective function J maps the control objectives into a scalar performance index. The objective function penalizes the predicted evolution of the tracking error and changes or variations in the (linearized) insertion index from one sampling instant k to the next.

The model predictive control module 34 also receives a modified reference grid current $i_{gd}*$, which is the sum of a basic reference grid current $i_{gl}*$ and a balancing current $i_{ge}*$ provided by the balancing control loop 30, and an actual converter state x, which comprises the actual branch currents $[i_1, i_2, i_3]$ and the sums of actual cell capacitor voltages $[v_1^\Sigma, v_2^\Sigma, v_3^\Sigma]$. The model predictive control module 34 controls the load currents and the total energy per branch. By minimizing a quadratic objective function subject to constraints and the evolution of a linearized and real-valued state-space model of the converter 16, the model predictive control module 34 determines the optimal real-valued insertion index $n_r=[n_1, n_2, n_3]$ for each of the branches 20.

In the second control layer 28b, a multilevel pulse width modulator 36 for each branch translates the insertion index $n_r=[n_1, n_2, n_3]$ into the three integer variables $N_r=[N_1, N_2, N_3]$, which denote the number of converter cells 22 to be inserted per branch 20.

The second control layer 28b of the hierarchical controller 18 may execute carrier-based pulse width modulation or space vector modulation or a related pulse width modulation method. The insertion index $n_r$ can be interpreted as the modulation index (reference voltage) of a multilevel pulse width modulation scheme. The modulator 36 translates the real-valued reference voltage into the integer $N_r$, which relates to the number of converter cells 22 to be inserted into the rth branch 20.

In the third control layer 28c, each branch 20 uses an independently operating balancing controller 38 that utilizes the redundancy within that branch 20 to balance the capacitor voltages for deciding on the gating/switching commands $[S_{1j}, T_{1j}], [S_{2j}, T_{2j}], [S_{3j}, T_{3j}]$, for the individual converter cells 22.

The lower control layer 28c with the balancing controllers 38 utilizes a redundancy in the converter states to balance the capacitor voltages within the branches 20 and minimizes the module switching frequency. Each branch 20 uses its own balancing controller 38, which receives as input from the modulator the number of modules $N_r$ to be inserted into the branch r. The controllers 38 compute the switching signals for the converter cells, namely the switching signals $[S_{1j}, T_{1j}], [S_{2j}, T_{2j}], [S_{3j}, T_{3j}]$, for the bottom and top IGBTs in the jth module.

The outer control loop 30 is used for compensating for the energy losses occurring at the switching devices and the passive elements of the converter 16. A PI controller, which receives as input the deviation of the stored energy (dependent on the sum of actual cell capacitor voltages $[v_1^\Sigma, v_2^\Sigma, v_3^\Sigma]$) in the converter 16 from its nominal value, provides at its output the balancing current $i_{ge}^*$. The modified reference grid current $i_{gd}^*$ is then composed by the basic reference grid current $i_{gl}^*$ and the balancing current $i_{ge}^*$. The basic reference gird current $i_{gl}^*$ ensures that the grid currents will be harmonic-free sinusoidal signals in phase with the respective grid voltages. The amplitude of $i_{gl}^*$ depends on the mean active power P that is consumed by the load 14.

Figure 6:
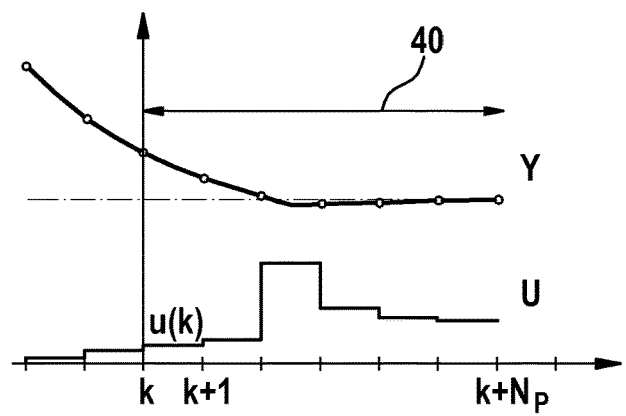
FIG. 6 shows a diagram for explaining model predictive control for the converter of FIG. 1.
Figure 7:
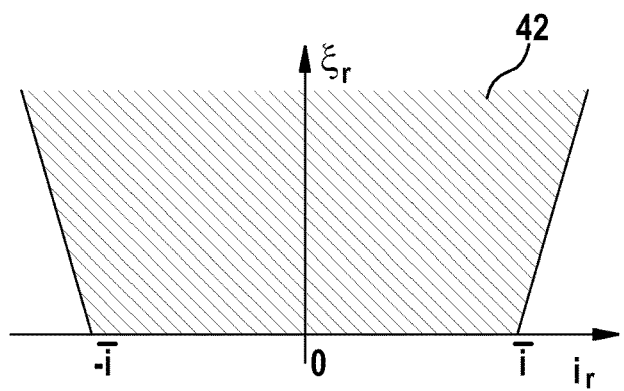
FIG. 7 shows a diagram illustrating a soft constraint on a branch current of the converter of FIG. 1.
Figure 8:
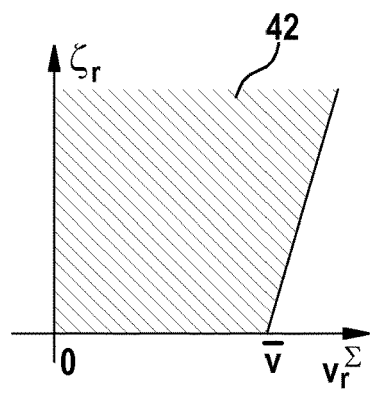
FIG. 8 shows a diagram illustrating a soft constraint on a capacitor voltage of the converter of FIG. 1.
Figure 9:
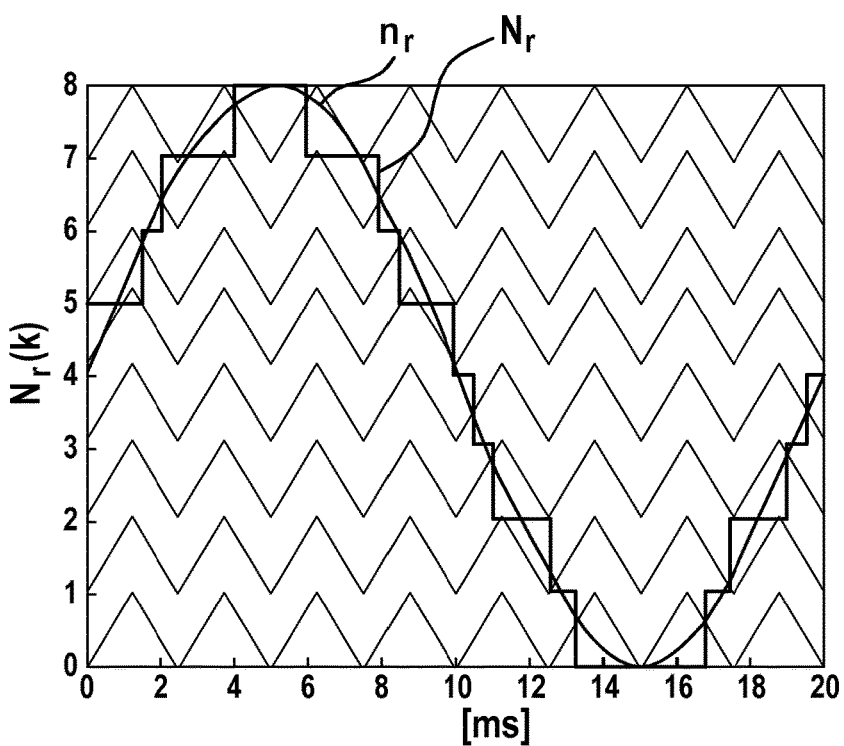
FIG. 9 shows a diagram illustrating pulse width modulation.

FIG. 6 shows a diagram for explaining the model predictive controller. The controller uses a discrete time stepping. The actual sampling instant k, a sequence of output variables Y and a sequence of manipulated variables U will be predicted by the module 34 over the prediction horizon 40 of length $N_p$.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 overall system (including converter, grid and load)
12 electrical grid
14 electrical load
16 modular converter
18 controller
20 converter branch
22 converter cell
24 cell capacitor
26 semiconductor switch
28a first control layer
28b second control layer
28c third control layer
30 active power balancing control loop
32 load current predictor
34 model predictive control module
36 pulse width modulator
38 balancing controller
40 prediction horizon
42 soft constraint

The invention claimed is:

1. A method for controlling a modular multilevel converter connected to an electrical grid for active power filtering and/or for compensating a load connected to the electrical grid, the method comprising:
receiving an actual load current and an actual converter state of the modular converter;
determining, from the actual load current and a history of previous load currents, a sequence of future load currents over a prediction horizon;
determining an optimum sequence of manipulated variables by solving an optimization problem based on the actual converter state and the sequence of future load currents, and based on sequences of future converter states predicted from sequences of manipulated variables over the prediction horizon, and subject to constraints; and
controlling the modular converter according to first converter cell switching states determined from a first element of the optimum sequence of manipulated variables.

2. The method of claim 1,
wherein the sequence of future load currents is determined by:
determining phases, amplitudes and frequencies of a fundamental waveform and of harmonies from the actual load current and the history of previous load currents; and
predicting the evolution of the fundamental waveform and the harmonics with the determined phases, amplitudes and frequencies over the prediction horizon.

3. The method of claim 1,
wherein the sequence of future converter states is predicted based on a modified reference grid current, which is the sum of a basic reference grid current and a balancing current, which balances the active power of the modular converter.

4. The method of claim 1, wherein the actual converter state and/or future converter states comprise branch voltages and/or branch currents of the modular converter.

5. The method of claim 1, wherein the manipulated variable includes real-valued normalized branch voltage references (insertion index), indicative of a fraction of converter cells inserted with, positive sign into each converter branch of the modular converter.

6. The method of claim 5, wherein a discrete-valued insertion index is determined from the real-valued insertion index by pulse width modulation.

7. The method of claim 1, wherein a next switching state, indicating which converter cells are to be connected to a converter branch, is determined from a next manipulated variable, such that capacitor voltages of the converter cells are balanced in the converter branch.

8. The method of claim 1, wherein the objective function is a quadratic function, which minimizes a change of the manipulated variable over the prediction horizon and/or which minimizes deviations of controlled variables from their references.

9. The method of claim 1, wherein the objective function comprises a term penalizing a magnitude of branch currents to minimize conduction and switching losses; and/or
wherein the objective function comprises a term penalizing a capacitor voltage ripple to minimize losses in cell capacitors and/or to reduce a size of cell capacitors.

10. The method of claim 1,
wherein the prediction model is solved subject to a hard constraint based on an inequality to be obeyed, when solving the optimization problem; and/or
wherein the optimization problem is solved subject to a soft constraint based on a soft constraint term added to the objective function, which maps a violation of a soft inequality constraint into a number.

11. A controller configured to operate a modular converter comprising:
a processing device;
a non-transitory computer readable medium structured to store instructions configured to:
receive an actual load current and an actual converter state of the modular converter, forecast a sequence of future load currents over a prediction horizon load current and a history of previous load currents, forecast a sequence of future converter states over the prediction horizon, optimize a sequence of manipulated variables using the actual converter state, the sequence of future load currents, and the sequence of future converter states, determine switching states of the first converter cell using the optimized sequence of manipulated variables, and operate the modular converter using the determined switching states of the first converter cell.

12. A converter system, comprising:

a modular converter, wherein the modular converter comprises at least one converter branch, which comprises a first converter cell and a second converter cell coupled in series, a controller configured to execute instructions so as to:

receive an actual load current and an actual converter state of the modular converter;

forecast a sequence of future load currents over a prediction horizon using the actual load current and a history of previous load currents, forecast a sequence of future converter states over the prediction horizon, optimize a sequence of manipulated variables using the actual converter state, the sequence of future load currents, and the sequence of future converter states, determine switching states of the modular converter using the optimized sequence of manipulated variables, and operate the modular converter using the determined switching states of the first converter cell.

13. The converter system of claim 12, wherein the converter comprises one of star-connected converter branches or double star-connected converter branches; or delta-connected converter branches.

14. The method of claim 2, wherein the sequence of future converter states is predicted based on a modified reference grid current, which is the sum of a basic reference grid current and a balancing current, which balances the active power of the modular converter.

15. The method of claim 2, wherein the actual converter state and/or future converter states comprise branch voltages and/or branch currents of the modular converter.

16. The method of claim 3, wherein the actual converter state and/or future converter states comprise branch voltages and/or branch currents of the modular converter.

17. The method of claim 2, wherein the manipulated variable includes real-valued normalized branch voltage references (insertion index), indicative of a fraction of converter cells inserted with positive sign into each converter branch of the modular converter.

18. The method of claim 3, wherein the manipulated variable includes real-valued normalized branch voltage references (insertion index), indicative of a fraction of converter cells inserted with positive sign into each converter branch of the modular converter.

19. The method of claim 4, wherein the manipulated variable includes real-valued normalized branch voltage references (insertion index), indicative of a fraction of converter cells inserted with positive sign into each converter branch of the modular converter.

* * * * *